May 10, 1960  D. S. GILETTA ET AL  2,936,023
APPARATUS FOR MAKING TIRE CASINGS
Filed May 27, 1955  5 Sheets-Sheet 1

INVENTORS
DARIO GILETTA,
ANTONIO PACCIARINI AND
MARCELLO ZULIANI

BY Stevens, Davis, Miller and Mosher
ATTORNEYS

May 10, 1960  D. S. GILETTA ET AL  2,936,023
APPARATUS FOR MAKING TIRE CASINGS
Filed May 27, 1955  5 Sheets-Sheet 2

INVENTORS
DARIO GILETTA,
ANTONIO PACCIARINI &
MARCELLO ZULIANI
BY Stevens, Davis, Miller and Mosher
ATTORNEYS

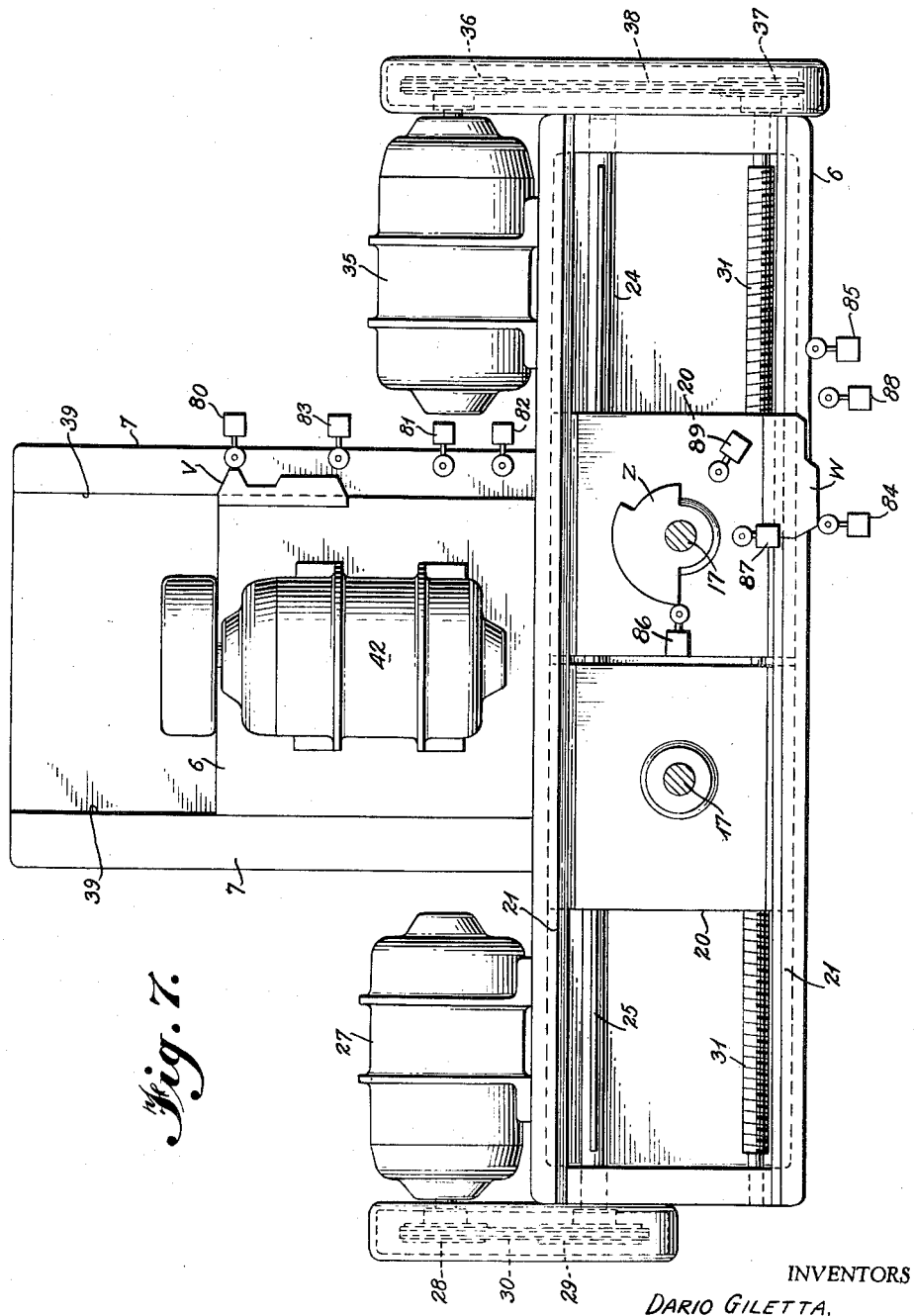

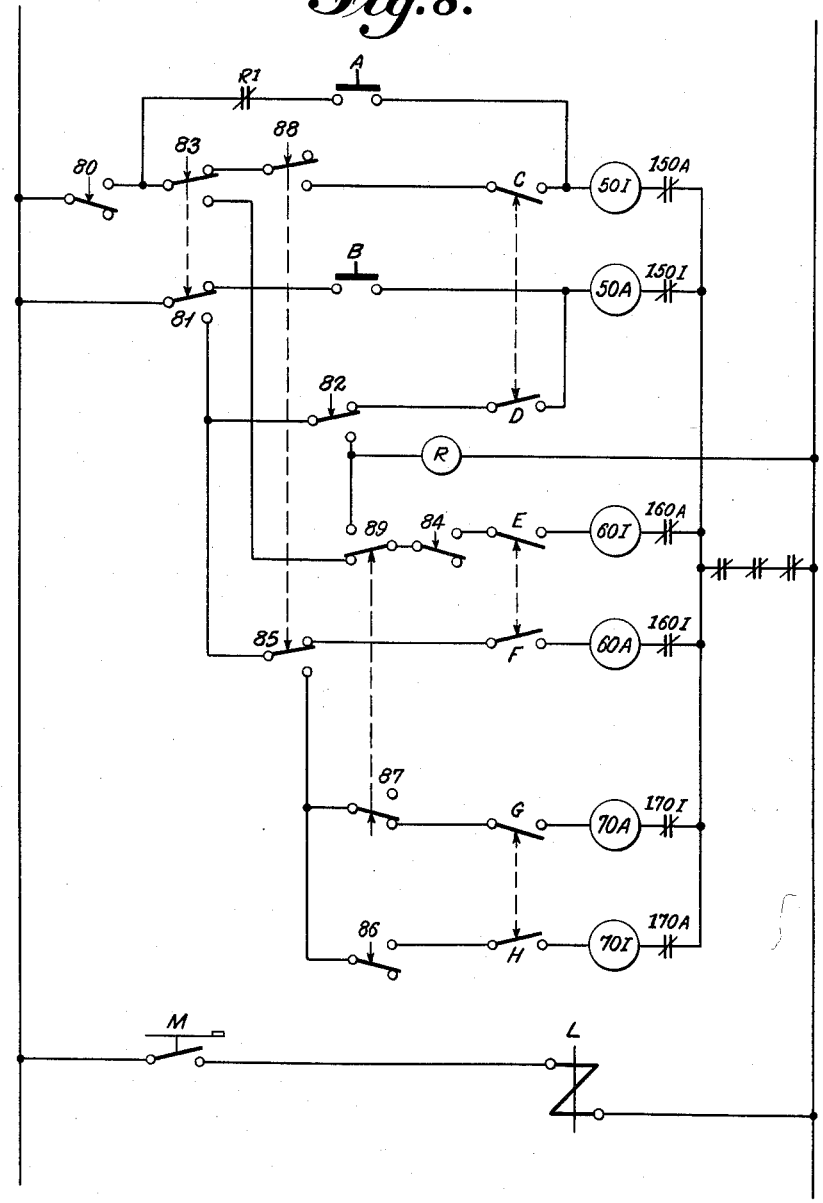

United States Patent Office 2,936,023
Patented May 10, 1960

2,936,023

APPARATUS FOR MAKING TIRE CASINGS

Dario S. Giletta, Antonio Pacciarini, and Marcello Zuliani, Milan, Italy, assignors to Pirelli S.p.A., Milan, Italy Application May 27, 1955, Serial No. 511,728

Claims priority, application Italy June 4, 1954

7 Claims. (Cl. 154—10)

The present invention relates to improvements in tire construction apparatus and more particularly to improvements in the stitching devices associated with the rotating drum upon which a tire carcass is built.

In previous apparatus for building tire casings for use with automotive vehicles, the multiple-ply structure of the tire carcass is usually built up on a rotatable drum of cylindrical shape having rounded marginal shoulders. It is a conventional practice to wrap two or more plies of rubberized fabric about the drum assembly, the fabric being a cord fabric of the weftless type.

The fabrics have a width substantially in excess of the length of the drum and hence their edges, since they extend beyond the two sides of the drum, are folded inwardly on the rounded shoulders of the drum radially towards the rotational axis thereof (ply turn down operation).

After winding the layers of fabric forming the successive plies on the drum, a pair of metallic bead rings covered with rubber are applied to the folded plies at the shoulders of the drum and serve as a means upon which the bead of the tire casing is formed. The marginal portions of the fabric which extend below the bead ring assemblies, after the positioning thereof, are then turned radially outwardly, around the bead rings, thus forming a kind of knot which ties the rings to the cylindrical portion of the carcass (ply turn up operation). Upon this first series of two or more fabric plies there is then applied a second series of two or more plies, whose marginal portions are folded, in registry with the rounded shoulders of the drum, about said previously applied fabric plies and bead rings. The casing is then completed by applying to the successive plies provided in this manner one or more strips of rubber stock corresponding to the intermediate and tread portions of the tire.

The number of fabric plies and bead rings as well as the sequence in which they are associated and in which the plies are folded before or after the application of the bead rings, varies, of course, with the variation in the size and the type of tire casing.

The casing, upon being removed from the drum assembly, has a cylindrical form and must, therefore, be subjected to a shaping operation, i.e. it must be shaped to a form similar to its final toroidal form prior to being vulcanized. Special apparatus are provided for carrying out the shaping operation. In these apparatus the casing is juxtapositioned between two parallel plates which are drawn together while air under pressure is delivered to the interior of the casing.

During this operation, if the casing being shaped is of the type having a single bead ring for each bead, the two marginal portions of the casing in which are located the bead rings will revolve without difficulty about the bead rings and will be disposed in radial planes with respect to the bead rings themselves at the conclusion of the shaping operation.

However, if the casing being produced has a bead obtained by wrapping the plies around two or more bead rings mounted in parallel relationship, the bead itself acquires a particular shape which does not permit the part of the casing in which the bead rings are located to rotate around the bead rings. It is therefore necessary for the marginal parts of the casing to be given, in the course of the building operation, the form and position which they are to maintain after the shaping of the tire casing. For this reason tire casings having a plurality of bead rings as part of each bead are not constructed in a substantially cylindrical form as in the case of tires having a single bead ring, but rather are constructed with the marginal portions preformed.

While it is known under conventional tire building practice to use apparatus which fold fabric around the shoulders of a drum having a substantially cylindrical form and turn the folded portions thereof over a single bead ring, by utilizing stitching devices which rotate about a predetermined center, it has heretofore not been possible to effect the folding of the marginal portions of a tire casing in which are incorporated two or more bead rings in each bead except by stitching devices operated or controlled by hand.

By the apparatus of the present invention, however, it is possible to carry out the folding and turning operations automatically on any tire building drum and therefore also on those having radially inwardly curved shoulders such as are presently employed in the industry for the construction of casings with beads having a plurality of bead rings.

The present apparatus, in fact, contemplates applying the combination of a rotational movement about a predetermined center as provided in conventional machines, with two additional transfer movements whereby an entire stitching operation can be carried out automatically in an efficient, expedient and economical manner.

The apparatus of the present invention is adapted to be used in connection with a conventional tire building machine of known type wherein the stitching operation of the fabric plies on the cylindrical part of the building drum is performed by a stitching device which is also of a type currently employed.

Other objects and advantages of the present invention will become more fully apparent from the following detailed description when taken in conjunction with the drawings in which:

Figure 7 is a view similar to Figure 4 showing the positions of the various electrical devices by which the movements of the stitching rollers are controlled; and Figure 8 is a schematic representation of the electrical control circuit of the apparatus.

Figure 1:
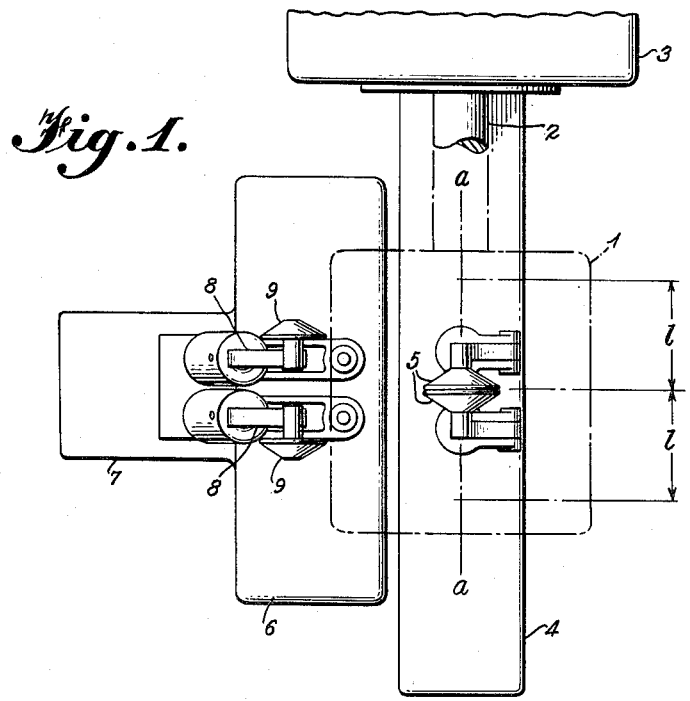
Figure 1 is a diagrammatic plan view showing the position of the novel stitching assembly and its relation to the other parts that constitute a conventional tire building machine.
Figure 2:
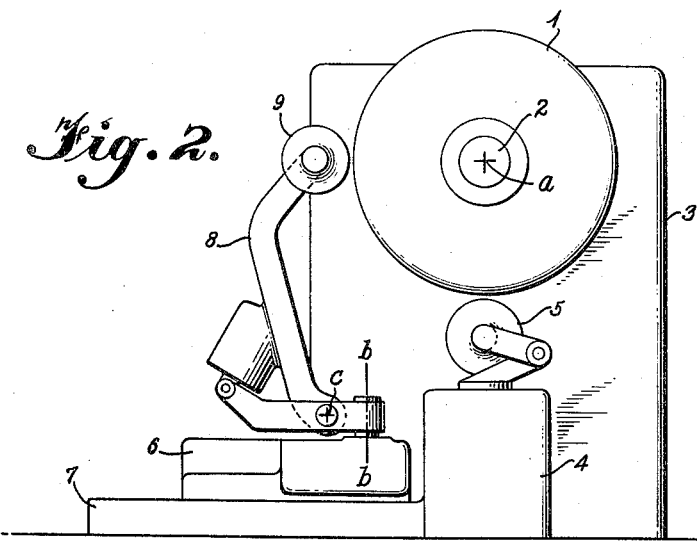
Figure 2 is a diagrammatic front elevational view of the organization depicted in Figure 1.

Referring now to the drawings and particularly to Figures 1 and 2, there is illustrated diagrammatically a tire building drum 1 rotatable about its axis a—a and supported on a mandrel 2 carried by a framework 3.

On a base 4 positioned below the tire building drum 1, is located an apparatus of conventional design comprising discs 5 for stitching fabric plies and rubberized reinforcing stock previously wrapped upon the cylindrical surface of the drum 1.

The apparatus, which is the object of the present invention, is mounted on an elongated support 6 positioned with its long axis parallel to the rotational axis of drum 1. The support 6 is in turn mounted on base 7 and is adapted to be slidably moved thereon in a direction normal to the rotational axis of the drum. Arms 8, which carry the stitching discs 9, are adapted to rotate about a vertical axis b—b, oscillate on a horizontal axis c, slide parallel to the rotational axis of the drum along support 6 and slide in a direction normal to drum axis a—a by causing the support 6 to slide on base 7.

Figure 3:
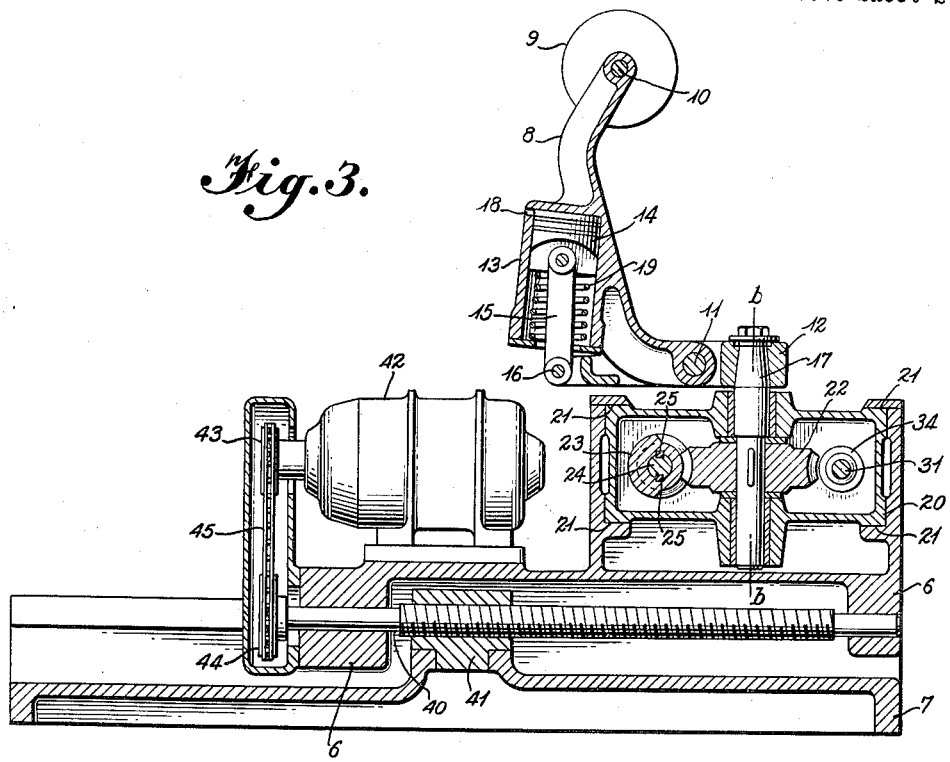
Figure 3 is a view in vertical section showing the novel stitching assembly of the present invention.
Figure 4:
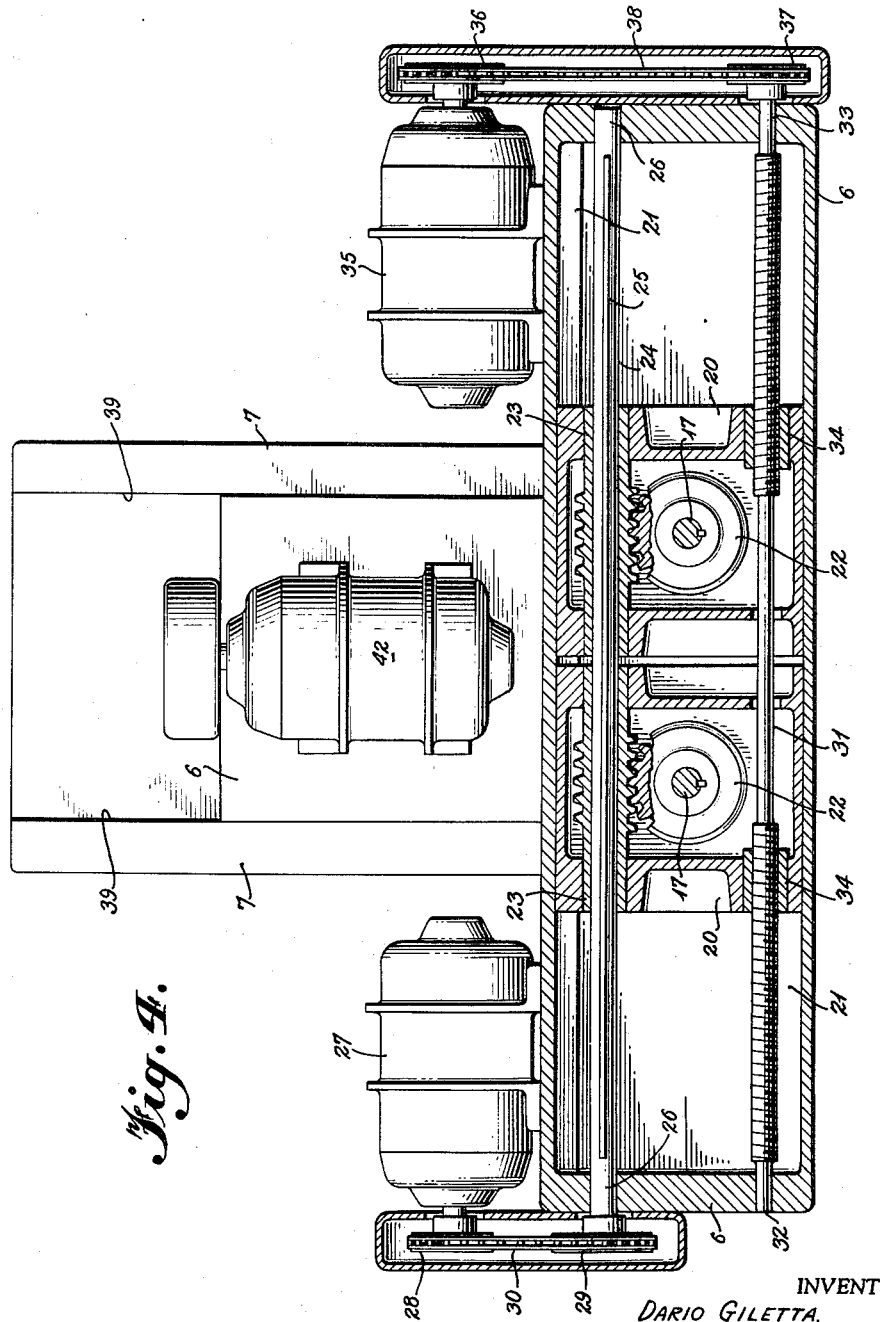
Figure 4 is a plan view partly in section showing the stitching assembly illustrated in Figure 3.

The apparatus for carrying out the stitching operation of the fabric plies around the shoulders of the drum is illustrated in greater detail in Figures 3 and 4. Since the arrangements for both discs 9 are identical in all respects, a complete description of the arrangement of one will suffice for a clear understanding of the nature and operation of both.

Disc 9 is supported by a pivot pin 10 secured to the upper end of arm 8, which in turn is pivoted at 11 on member 12. A cylinder 13 is fixed to arm 8 and contains a piston 14. Piston rod 15 is pivoted on a pin at 16 fixed in an extension of member 12. Member 12 is rigidly secured to one end of a shaft 17. The cylinder 13 is provided with an opening 18 for the introduction and discharge of compressed fluid. A spring 19 is mounted inside cylinder 13 in a manner to oppose the movement of the piston 14 toward the lower end of cylinder 13. Shaft 17 is supported by housing 20 which is adapted to slide on support 6 along guide 21. A worm gear 22 is rigidly secured to shaft 17 and meshes with an externally threaded sleeve worm 23 supported by housing 20. The sleeve 23 is mounted on a shaft 24 upon which it can slide axially, rotation about said shaft being prevented, however, by keys or splines 25. The shaft 24 is carried at its ends 26 by support 6.

The rotation of shaft 24 is controlled by motor 27 by means of sprockets or pulleys 28 and 29 and chain or belt 30.

Shaft 31, carried at its ends by support 6, is constituted of two threaded sections having respectively right and left hand threads and is received in internally threaded sleeves 34 which are rigidly secured to housing 20. The rotation of shaft 31 is controlled by motor 35 by means of pulleys or sprockets 36 and 37 and belt or chain 38.

Support 6 is in turn mounted on base 7 upon which it is adapted to slide along guides 39 in a direction normal to the rotational axis of the building drum. In order to control this movement there is provided a threaded shaft 40 which is associated with an internally threaded member 41 and caused to rotate by motor 42 with the aid of pulleys or sprockets 43 and 44 and belt or chain 45.

The operation of the machine will now be described with reference to Figures 5 and 6. The invention will be best understood from a description of these two extreme cases, namely the stitching of the first and last pair of fabric plies around the shoulders of the drum, all other cases being coextensive therewith.

Figure 5:
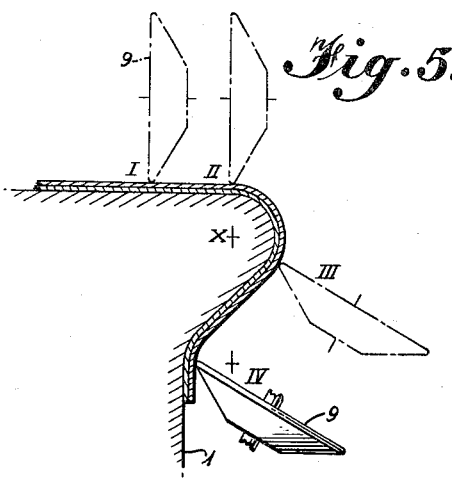
Figure 5 is a schematic representation, in a horizontal plane, of a shoulder of a building drum illustrating the manner in which the first pair of plies are folded around the shoulder of the drum.
Figure 6:
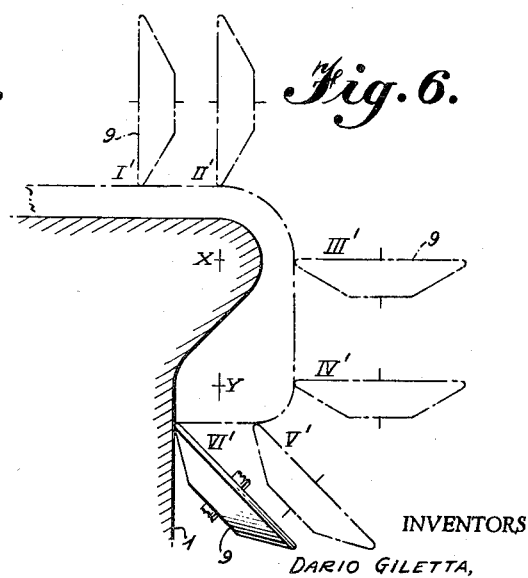
Figure 6 is a schematic representation like Figure 5 but illustrating the manner in which the last pair of plies are folded around the shoulder of the drum.

The first pair of plies, after being wound around the drum, must be folded around the shoulders thereof by means of discs 9 (Figure 5). To carry out this operation it is necessary to first start the motor 42 which, by means of sprockets 43 and 44 and chain 45, causes rotation of threaded shaft 40 and thus determines the sliding movement of support 6 normal to the rotational axis of drum 1. When the support 6 has reached the position most suitable for stitching engagement with the type of tire casing being constructed, its sliding movement is limited by an automatic cut out (later to be described in connection with the description of Figures 7 and 8) which stops the motor 42. A compressed fluid (for example air) is then introduced through openings 18 into cylinders 13 whose pistons 14 compress springs 19 and cause rotation of arms 8 about pivots 11 to bring discs 9 in engagement with the fabrics at position I. By actuating motor 35, which controls the rotations of screw 31 by means of sprockets 36 and 37 and chain 38, it is possible to shift the housing 20 in a direction parallel to the rotational axis of the drum. Discs 9 thus effect the stitching of section I—II and, when they reach position II, an adjustable automatic cut out (later to be described in connection with the description of Figures 7 and 8) stops the motor 35 thereby preventing further movement of housing 20. At this point the motor 27 is brought into action and it controls the rotation of shafts 17 by means of sleeves 23, gears 22, shaft 24, sprockets 28, 29 and chain 30. Thus, arms 8 rotate around axes b—b which pass through the curve centers X of the shoulders of the drum.

The rotation of the discs 9 around axes b—b is arrested by the operator of the tire building machine at the most suitable point. Upon arresting the rotation of shafts 17 and discs 9, for example at position III, the fabric plies are then stitched along section III—IV by again actuating motor 42 which causes the support 6 to slide towards the rotational axis of the drum. During all these movements, piston and cylinder assembly 13, 14 provides a means of maintaining discs 9 constantly pressed against the fabrics and to permit their rotation about pivots 11 in the most suitable manner. As soon as the discs 9 have reached position IV an automatic cut out stops motor 42 and the operator discharges the air from cylinders 13 removing the discs 9 from engagement with the plies.

For stitching the last pair of fabric plies around the shoulders of the drum (Figure 6), air is introduced into cylinders 13 for bringing the discs 9 in contacting engagement with the fabrics at position I'. Motor 35 is then actuated to cause the discs 9 to effect the stitching operation along section I'—II'. When the discs 9 have reached II' their movement parallel to the rotational axis of the drum will be limited by the automatic cut out which stops the motor 35. At this point there is brought into action motor 27 which controls the rotation of arms 8 around axes b—b passing through curve centers X defining the centers of the shoulders. When the discs 9 have reached position III', which is established by the operator of the tire building machine, their rotational movement is stopped and motor 42 actuated which controls the displacement of discs 9 toward the rotational axis of the drum. An automatic cut out stops this movement when the discs have reached the position IV'. The discs are then caused to rotate from position IV' to V' by actuating motor 27 which controls the rotation of arms 8 around axes b—b which now pass through centers Y. Simultaneously the arms 8 rotate around pivots 11 to the extent necessary to keep discs 9 pressed against the fabric plies. An automatic cut out stops the rotation of the discs at position V'. The stitching from position V' to position VI' is effected by causing the motor 35 to rotate in a direction opposite to that of stitching over the section defined I'—II'. It is arrested by an automatic cut out as soon as the discs have reached the position VI'.

For stitching the last layers of fabric plies there is normally provided a rotation of 90° of the arms 8 about centers X and a second rotation of 45° around centers Y.

The direction of rotation of motors 27, 35 and 42 may, of course, be reversed either to return the discs to their starting position or to have them perform their work in opposite directions.

The fabric plies that are applied to the fabric previously placed on the drum are normally caused to uniformly adhere thereto by means of stitching rollers which engage the fabrics also along the cylindrical part of the drum. For this purpose there are provided a pair of lower disc-type rollers 5, each adapted to cover the distance 1 (Figure 1) and yieldingly press against the fabrics.

In order to control and coordinate the movements performed by the various parts of the apparatus during the stitching and compacting of the plies, there is provided an electrical control system including remote control circuit breakers. Figures 7 and 8 show diagrammatically the mechanical controls and the electrical scheme for regulating the motors 27, 35, and 42, as well as pistons 14.

The motor 42 is controlled by relays 50A and 50I with one of the relays controlling rotation of the motor 42 in one direction and the other relay controlling rotation of the motor 42 in the opposite direction. Relays 50A and 50I have normally closed contacts 150A and 150I respectively; the normally closed contacts of relay 50A are in series with relay 50A, and vice versa. The motor 42 causes the support 6 to be moved normally with respect to the rotational axis of the drum 1 between a position corresponding to switch 80 and a position corresponding to switch 82. The motor 35 is controlled by relays 60A and 60I with each relay determining rotation of the motor 35 in one direction. Relays 60A and 60I have normally closed contacts 160A and 160I which are in series with the relays 60I and 60A, respectively. The motor 35 causes the housing 20 to be moved parallel to the rotational axis of the drum 1 between a position corresponding to switch 84 and a position corresponding to switch 85. The motor 27 is similarly controlled by relays 70A and 70I and causes arms 8 to rotate about their axes b—b between a position corresponding to switch 86 and a position corresponding to switch 87. Relays 70A and 70I have normally closed contacts 170A and 170I, respectively; the contacts of relay 70A are in series with the relay 70I, and vice versa.

There are provided as master controls master switches A and B and a six way master lever controller (not shown) which acts upon contact switches C to H. The delivery and discharge of compressed air to and from cylinders 13 is controlled by a three way valve (not shown) actuated by means of a treadle M.

The operation of the apparatus from the standpoint of the electrical controls will now be described. It will be assumed that the operation is started from a position of rest with the support 6 in withdrawn position, housings 20 positioned together, discs 9 parallel to each other and the cylindrers 13 discharged. The various relays and switches are shown in Figures 7 and 8 as they are in their position of rest. To initiate the operation, the master switch B is closed. This permits current to be supplied through switch 81 and master switch B to the relay 50A and normally closed contacts 150I. The relay 50A when energized starts the motor 42 which rotates in a direction to move the support 6 toward the building drum 1. Carried on the support 6 is a cam V which in its position of rest presses on the switch 80 causing it to assume the position shown in Figure 8. As the support 6 starts to move, however, the cam V no longer presses on the switch 80 and thus it deflects to its other position. The support 6 continues to move until the cam V engages the switches 81 and 83 which it will do simultaneously. When this occurs both switches 81 and 83 will be deflected under the influence of the cam V to their other positions, and this will result in the de-energization of the relay 50A causing simultaneously therewith the closing of normally closed contacts 150A. Since the relay 50A is de-energized, it will stop the motor 42, thereby limiting further forward movement of support 6.

At this point, the stitching operation is to be initiated. The operator thereupon depresses the treadle M thereby energizing the relay L which in turn actuates the appropriate valve to cause air under pressure to be delivered to the cylinders 13. This, in turn, results in arms 8 rotating about their pivots 11 until the discs 9 are pressed into engagement with the plies wrapped on the drum 1. At this time, the discs 9 are in the position designated I' in Figure 6.

The master lever controller (not shown) is then actuated to close contact F. This permits current to flow through deflected switch 81, switch 85, now closed switch F, relay 60A and normally closed contacts 160I. The relay 60A being energized, it will in turn cause normally closed contacts 160A to open and also the motor 35 to be energized to rotate in a direction to cause the housings 20 to move apart. The right hand housing 20 as viewed in Figure 7 is provided with a cam W which in position of rest engages the switch 84, holding it in the position shown in Figure 8. As the housing 20 moves to the right under the influence of motor 35, the cam W will eventually arrive at a position where it simultaneously presses on switches 85 and 88, deflecting same to their other positions. As the cam W moves away from the switch 84, it will deflect to its other position from that shown in Figure 8. When the cam W reaches the position where it engages switches 85 and 88, it will deflect them to their other positions from those shown in Figure 8.

In the preceding paragraph, the discs 9 have stitched the fabric on the drum from point I' to point II'. Thereafter the master lever controller is actuated to close the switch G. When this occurs, current flows through switch 81, switch 85, switch 87, switch G and relay 70A energizing same. Relay 70A in turn starts the motor 27 which causes the rotation of the discs 9 and arms 8 on the shafts 17. The right hand shaft 17 includes a cam Z which in its position of rest bears against the switch 86 maintaining it open. As the cam Z rotates with the shaft 17 it will eventually arrive at a position where it will simultaneously engage the switches 87 and 89 deflecting them to their other positions from those shown in Figure 8. Motor 27, however, it cut off manually by actuating the lever controller to open switch G before cam Z has completed its rotation to engage switches 87 and 89. During this operation, the stitching discs 9 have effectively stitched or rolled the fabric on the drum from point II' to point III', the axes b—b at this time passing through the centers X.

At this point in the operation, the master lever controller is actuated to deflect switch D to its other position from that shown in Figure 8. Accordingly, current now passes through switch 81, switch 82, switch D and relay 50A. This results in the motor 42 again being energized to advance the support 6 a second time. During its advance, the cam V will press upon the switch 82 further limiting the advance of the support 6 since switch 82, when deflected by the cam V to its other position from that shown in Figure 8, will open the circuit through the relay 50A while at the same time closing the circuit through the relay R to open the normally closed contacts R1. It will be appreciated that the cam V is designed to press against the switches 81 and 82 simultaneously whereby in the movement of the support 6 as above described, the switch 81 will be maintained in its deflected position. During movement of the support 6 the stitching discs 9 will have proceeded from point III' to point IV'. During the advance of the support 6, the cam V will release from the switch 83.

To stitch or roll from position IV' to position V' about the centers Y, the master lever controller is then actuated to close the contact or switch G a second time. This permits current to flow through switch 81, switch 85, switch 87, switch G and relay 70A to cause the energization of motor 27. This results in a second rotation of arms 8 and discs 9 around their axes b—b which, in this phase of the operation, pass through the centers Y. The rotation of the arms 8 is limited by the cam Z. When this cam Z presses upon the switches 87 and 89 which it does simultaneously they will be deflected to their other positions from those shown in Figure 8, thereby opening the circuit through the relays 70A which causes the motor 27 to stop.

To stitch or roll from point V' to point VI', it is necessary to actuate the master lever controller to close the switch E. This permits current to be supplied to the relay 60I through the switches 81, 82, 89, 84 and E. Relay 60I, when energized, drives the motor 35 in a direction opposite from that in which it is driven when started by relay 60A. Hence, the stitching operation is carried on from position V' to position VI'. Thus, the housings 20, during this interval, move toward each other until the cam W strikes switch 84 returning it to its position of rest which opens the circuit through the relay 60I. During the movement of the housings 20 together, the support 6 cannot be withdrawn from the drum since the cam W no longer presses on the switch 88 and hence it is returned to its normal position and also the normally closed contacts are maintained opened by the relay R. Accordingly, at this time, current cannot pass through the relay 50I even if the master lever controller is actuated to close the switch C.

To return the discs 9 to their initial starting position, the treadle M is released for the purpose of discharging air from the cylinders 13 and removing the discs 9 from the periphery of the drum. The housings 20 are then moved away from each other by closing the contact F which results in relay 60A being energized by current passing through deflected switch 81, switch 85, and switch F. This movement is continued until the cam W presses on the switches 88 and 85 again deflecting them to their other positions from those shown in Figure 8. When this occurs, current flow through the relay 60A is interrupted. The discs 9 are then caused to rotate in reverse direction around axes b—b upon the closing of the switch H as a result of manipulation of the master lever controller. This permits current to flow through the relay 70I being admitted thereto through switches 81, 85, 86 and H. The rotation of the disc 9 in reverse direction is continued until the cam Z presses upon the switch 86 which breaks the circuit through the relay 70I and hence further rotation of the discs 9 is prevented. To retract the support 6 until it is in the position occupied at the start of the stitching operation, the contact C is closed and the relay 50I is energized by current passing through the switches 80, 83, 88 and C. Relay 50I causes the motor 42 to rotate in a direction opposite from the direction of rotation caused by the relay 50A. Hence the support 6 will withdraw from the drum 1 until the cam V presses against the switch 83 deflecting it to its other position. During the withdrawal of the support 6, the switch 82 is returned to its normal at rest position since the cam V no longer presses against it. This deenergizes the relay R and in turn results in contacts R being closed.

At this point in the operations, the housings 20 are moved toward each other by closing switch E by properly manipulating the master lever controller. The relay 60I is now energized by current being admitted through switches 80, 83, 89, 84 and E. Energizing of relay 60I causes the motor 35 to drive in a direction to bring the housings 20 together. Movement of the housings 20 will continue until the cam W presses upon switch 84 returning it to its normal at rest position as shown in Figure 8. Switch 84 upon opening will de-energize the relay 60I. To fully retract the support 6 to its position of rest, it is now necessary to close master switch A which results in relay 50I being energized. Current is admitted to the relay 50I through the switch 80, normally closed contacts R1 and master switch A. Energizing of relay 50I will cause motor 42 to drive in a direction to withdraw the support 6 from the drum 1. The withdrawal of support 6 will continue until the cam V presses against the switch 80 opening same. This breaks the circuit to the relay 50I.

Although the present invention has been shown and described with reference to a particular embodiment, nevertheless, it will be appreciated that various changes and modifications such as are obvious to one skilled in the art are within the spirit, scope and contemplation of the invention.

We claim:

1. Apparatus to be located adjacent a tire building drum having rounded shoulders, for stitching fabric plies around the shoulders of said tire building drum, wherein said tire building drum is mounted on a rotatable mandrel which is rotatably received in a frame work having a substantially horizontal base positioned below said drum, comprising in combination, a slidable support slidably received within a first guide means in said base for sliding movements towards and away from the vertical plane passing through the rotational axis of said drum, a pair of housings mounted in a second guide means in said slidable support for sliding movement towards and away from one another in a direction substantially parallel to the rotational axis of said drum, a vertical shaft mounted in each of said housings, a carrier member secured to the upper end of each of said vertical shafts, an upright arm mounted on each carrier member and being pivotally attached to said carrier member at the lower end of said arm for pivotal movement about a substantially horizontal axis, a stitching disc rotatably mounted at the upper end of each arm, each disc being rotatably mounted on an axis fixed relative to said disc and said arm, means coacting between each carrier member and its corresponding arm for pivoting said arms in unison about said horizontal axes, means for rotating said shafts simultaneously in opposite directions, means coacting between said slidable support and said housings for moving said housings simultaneously and in opposite directions substantially parallel to the rotational axis of said drum, and means coacting between said base and said slidable support for moving said slidable support in a direction towards and away from said vertical plane; whereby said slidable support with said housings, said arms and said discs thereon are moved bodily towards said drum; whereby said means for pivoting said arms are actuated subsequently to move said discs against the fabric plies at positions spaced from the ends of said drum; whereby said means for moving said housings are actuated subsequently to move said discs outwardly towards the ends of said drums for stitching the plies adjacent the opposite ends of said drum; and whereby said means for rotating said shafts is actuated subsequently to move said discs around the rounded shoulders of said drum for stitching the fabric plies covering said rounded shoulders, thereby rotating said arms with said discs thereon about vertical axes passing through the centers of curvature of said rounded shoulders in the horizontal axial section of said drum at the side of the latter where the discs are disposed.

2. The apparatus according to claim 1 wherein the means for rotating said vertical shafts simultaneously in opposite directions includes a worm gear attached to each of said vertical shafts, a horizontal shaft journalled in said slidable support, a pair of oppositely threaded worms keyed to said horizontal shaft and meshing with the worm gears on said vertical shafts, and means for rotating said horizontal shaft.

3. An apparatus for folding and turning the plies to form the carcass of a pneumatic tire about the ends of a building drum, said ends being formed with rounded shoulders about which the plies are folded and turned, said apparatus comprising a base, a pair of supports mounted on said base below the ends of said drum, said supports having a freedom for guided movement over said base in a horizontal plane in two directions, one parallel to the rotational axis of the drum and the other at right angles thereto, a carrier member rotatably mounted on each support for rotation about a vertical axis, a supporting arm pivotally mounted on each carrier member for angular movement relative to said carrier member about a horizontal axis, a folding and turning disc revolvably mounted on each supporting arm, each said disc being mounted for rotation on an axis fixed relative to said disc and said arm, means coacting between each carrier member and its respective supporting arm for yieldingly urging said supporting arm about said horizontal axis in a direction tending to move the disc on the arm away from the external surface of said drum, means for urging both of said supporting arms simultaneously about said horizontal axes in a direction to move said disc towards said external surface of said drum, means for rotating both of said carrier members simultaneously and in opposite rotary directions about their respective vertical axes, means for slidably moving both of said supports simultaneously towards and away from one another in a direction parallel to the rotational axis of said drum, and means for slidably moving said supports simultaneously towards and away from said rotational axis of said drum.

4. Apparatus to be located adjacent a tire building drum having rounded shoulders, for stitching fabric plies around the shoulders of said tire building drum, said tire building drum being mounted on a rotatable mandrel which is rotatably received in a framework having a substantially horizontal base positioned below said drum, comprising, an arm, a stitching disc rotatably mounted at one end of said arm, said disc being rotatably mounted on an axis fixed relative to said disc and said arm, a carrier member, means pivotally mounting the other end of said arm to said carrier member for pivotal movement about a horizontal axis, means for pivoting said arm about said horizontal axis, slide means received within a first guide means in said base for sliding movement in a direction substantially at right angles to a vertical plane passing through the rotational axis of said drum, carriage means received in a second guide means in said slide means for linear sliding movement in a horizontal plane, and in a direction substantially parallel to the rotational axis of said drum, a vertical shaft mounted in said carriage means for rotation about a vertical axis fixed relative to said carriage means, said carrier member being fixed to said shaft for rotation therewith about said vertical axis, means coacting between said slide means and said carriage means for moving said carriage means in a direction substantially parallel to said rotational axis of said drum, and means coacting between said base and said slide means for moving said slide means in a direction substantially at right angles to the vertical plane passing through said rotational axis of said drum.

5. Apparatus to be located adjacent a tire building drum having rounded shoulders, for stitching fabric plies around the shoulders of said tire building drum, said tire building drum being mounted on a rotatable mandrel which is rotatably received in a framework having a substantially horizontal base positioned below said drum, comprising in combination (1) two stitching assemblies each of which comprises an arm, a stitching disc rotatably mounted at one end of said arm, said disc being rotatably mounted on an axis fixed relative to said disc and said arm, a carrier member, means pivotally mounting the other end of said arm to said carrier member for pivotal movement about a horizontal axis, means for pivoting said arm about said horizontal axis, carriage means, a shaft mounted in said carriage means for rotation about a vertical axis fixed relative to said carriage means, said carrier member being fixed to said shaft for rotation therewith about said vertical axis; (2) slide means received within a first guide means in said base for sliding movement in a direction substantially at right angles to a vertical plane passing through the rotational axis of said drum and receiving said carriage means in a second guide means in said slide means for linear movement in a horizontal direction substantially parallel to the rotational axis of said drum; (3) means to rotate said shafts in common in opposite directions; (4) means to move said carriage means in said slide means in common in opposite direction; and (5) means for moving said slide means toward and away from said vertical plane.

6. In a pneumatic tire building machine, the combination of an apparatus according to claim 3 with a separate stitching apparatus for the portion of the tire which is built up on the cylindrical portion of the building drum, located between the rounded shoulders thereof.

7. An apparatus according to claim 6 wherein electrical and mechanical limit switches are provided to limit the individual swinging and translational movements.

References Cited in the file of this patent

UNITED STATES PATENTS

| | | |
|---|---|---|
| 2,161,117 | Wikle | June 6, 1939 |
| 2,409,974 | Breth et al. | Oct. 22, 1946 |
| 2,455,038 | Breth | Nov. 30, 1948 |
| 2,521,143 | Benson | Sept. 5, 1950 |